(12) United States Patent
Lan

(10) Patent No.: US 7,021,651 B2
(45) Date of Patent: Apr. 4, 2006

(54) STROLLER WITH MEANS FOR LIMITING DIRECTION OF A WHEEL

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 169 days.

(21) Appl. No.: 10/794,456

(22) Filed: Mar. 5, 2004

(65) Prior Publication Data

US 2005/0194755 A1    Sep. 8, 2005

(51) Int. Cl.
*B62B 7/06*    (2006.01)
*B62B 1/00*    (2006.01)

(52) U.S. Cl. .................. 280/642; 280/647; 280/87.021; 280/47.371; 280/642; 280/650; 280/654; 280/47.38

(58) Field of Classification Search ........... 280/47.131, 280/47.371, 647, 62
See application file for complete search history.

(56) References Cited

U.S. PATENT DOCUMENTS

| 2,972,488 | A | * | 2/1961 | Alsop | 280/47.371 |
| 3,110,504 | A | * | 11/1963 | Myers | 280/649 |
| 3,797,848 | A | * | 3/1974 | Burnham | 280/644 |
| 4,023,825 | A | * | 5/1977 | Kassai | 280/649 |
| 4,856,744 | A | * | 8/1989 | Frankel | 248/215 |
| 5,046,750 | A | * | 9/1991 | Heubl | 280/87.021 |

\* cited by examiner

*Primary Examiner*—Christopher P. Ellis
*Assistant Examiner*—Cynthia F. Collado
(74) *Attorney, Agent, or Firm*—Darby & Darby

(57) ABSTRACT

A stroller has a direction-limiting device including a direction-limiting element movable relative to a stroller frame between a limiting position, where the direction-limiting element is inserted into a limiting hole in a wheel-supporting member of a wheel unit so as to prevent rotation of the wheel-supporting member relative to the stroller frame, and a release position, where the direction-limiting element is removed from the limiting hole so as to permit the rotation of the wheel-supporting member relative to the stroller frame. A control device includes an adjusting member disposed on an upper portion of a handle unit of the stroller frame, and a pull cord disposed between the adjusting member and the direction-limiting element. The adjusting member is operable to move the direction-limiting element between the limiting position and the release position.

11 Claims, 11 Drawing Sheets

STROLLER WITH MEANS FOR LIMITING DIRECTION OF A WHEEL

BACKGROUND OF THE INVENTION

1. Field of the Invention

This invention relates to a stroller, and more particularly to a stroller with means for limiting the direction of a wheel.

2. Description of the Related Art

A front wheel of a conventional stroller is provided with a direction-limiting device that can be operated to permit change of the direction of the front wheel. However, the direction-limiting device is disposed typically on a bottom of a stroller frame of the stroller. Thus, when it is desired to change the direction of the front wheel, the user has to bend down so as to operate the direction-limiting device, thereby resulting in difficulties during use.

SUMMARY OF THE INVENTION

The object of this invention is to provide a stroller that includes a direction-limiting device, which can be operated easily to change the direction of a wheel.

According to this invention, a stroller has a direction-limiting device including a direction-limiting element movable relative to a stroller frame between a limiting position, where the direction-limiting element is inserted into a limiting hole in a wheel-supporting member of a wheel unit so as to prevent rotation of the wheel-supporting member relative to the stroller frame, and a release position, where the direction-limiting element is removed from the limiting hole so as to permit the rotation of the wheel-supporting member relative to the stroller frame. A control device includes an adjusting member disposed on an upper portion of a handle unit of the stroller frame, and a pull cord disposed between the adjusting member and the direction-limiting element. The adjusting member is operable to move the direction-limiting element between the limiting position and the release position. Because the adjusting member is disposed on the upper portion of the handle unit, it can be operated easily.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
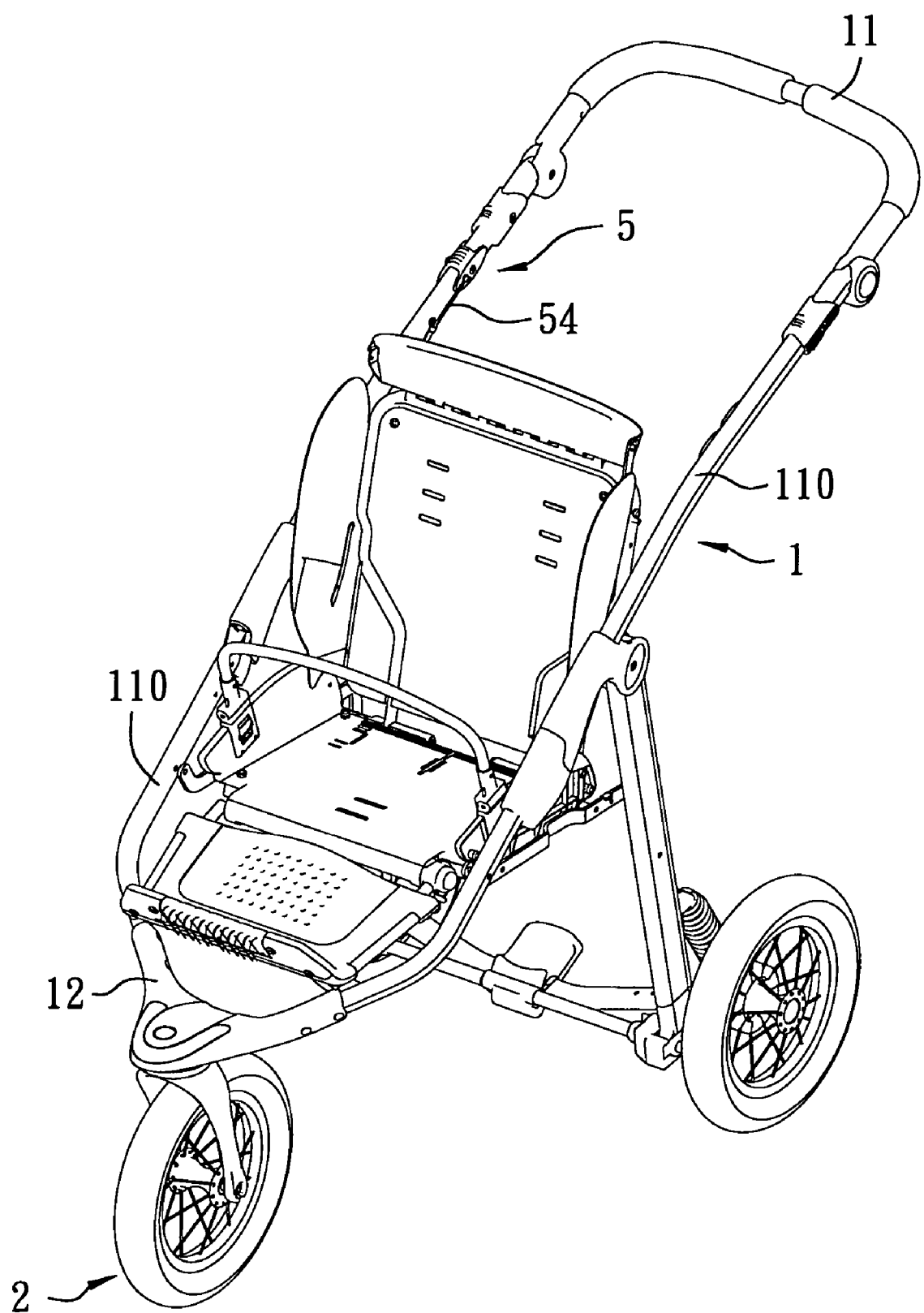
FIG. 1 is a perspective view of the first preferred embodiment of a stroller according to this invention.

Before the present invention is described in greater detail in connection with the preferred embodiments, it should be noted that similar elements and structures are designated by like reference numerals throughout the entire disclosure.

Figure 2:
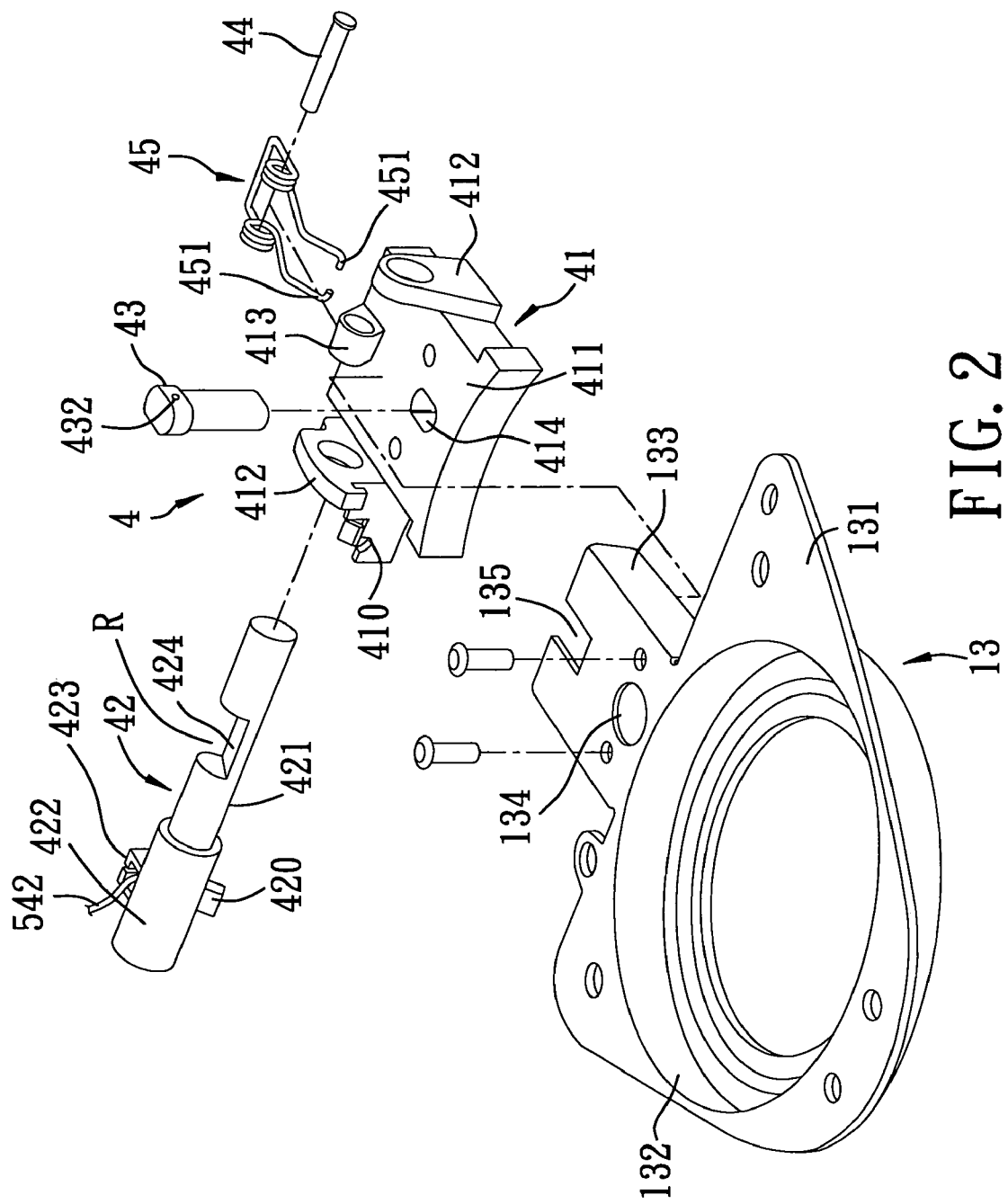
FIG. 2 is a partly exploded perspective view of a mounting seat and a direction-limiting device of the first preferred embodiment.
Figure 3:
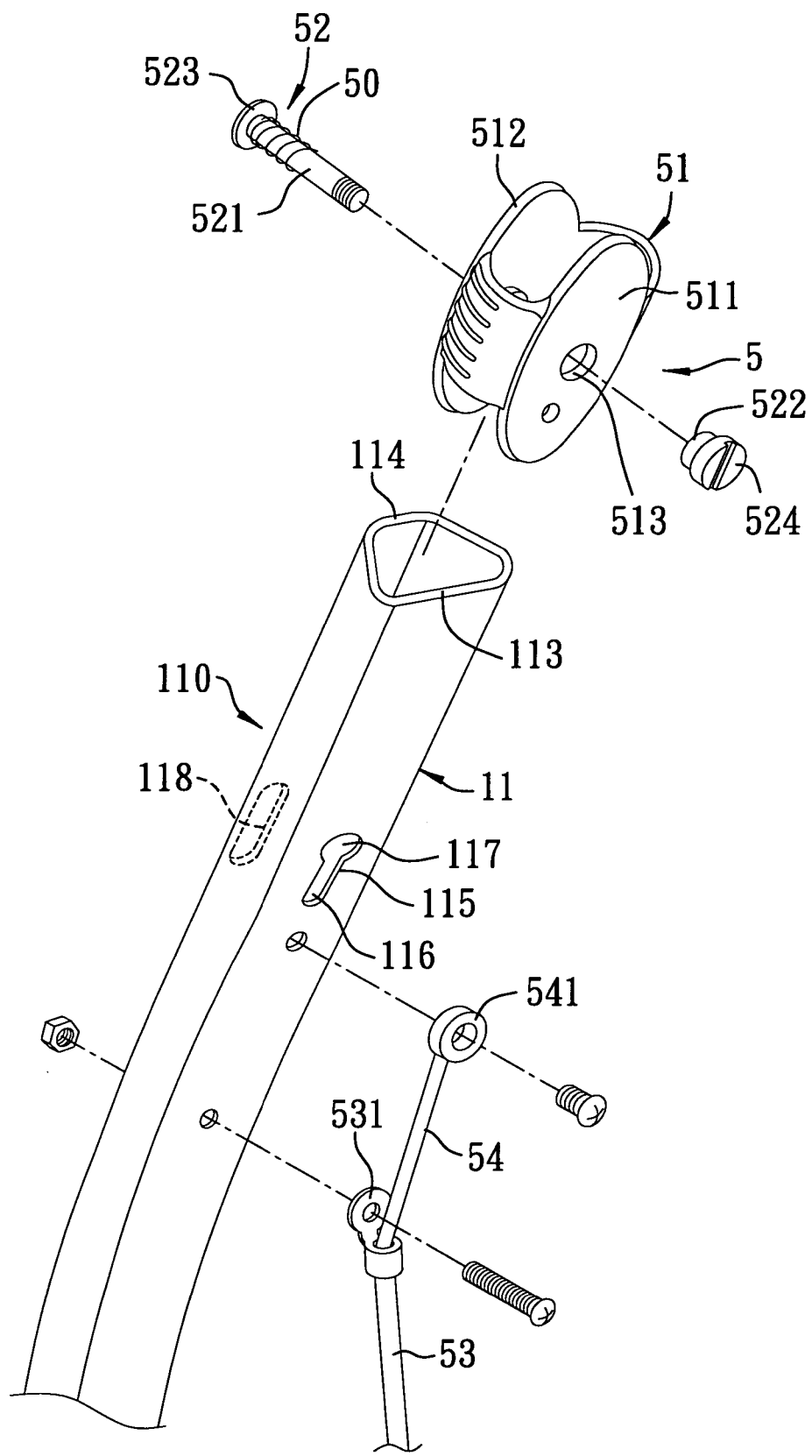
FIG. 3 is a partly exploded perspective view of a right wheel rod and a control device of the first preferred embodiment.

Referring to FIGS. 1, 2, and 3, the first preferred embodiment of a stroller according to this invention is shown to include a stroller frame 1, a wheel unit 2, a direction-limiting device 4, and a control device 5.

The stroller frame 1 includes a handle unit 11, a wheel seat 12 connected fixedly to a front lower portion of the handle unit 11, and a mounting seat 13 disposed below and connected fixedly to the wheel seat 12. The handle unit 11 includes a pair of aligned left and right wheel rods 110. The right wheel rod 110 (see FIG. 3) is tubular, and is formed with opposite inner and outer walls 113, 114 that are parallel to each other. The inner wall 113 is formed with a positioning slot 115 therethrough, which has a uniform-diameter lower slot portion 116 and a circular upper slot portion 117. The uniform-diameter lower slot portion 116 has an upper end coupled with a lower end of the circular upper slot portion 117, and a width smaller than the diameter of the circular upper slot portion 117. The outer wall 114 is formed with a slide slot 118 therethrough, which is aligned with the positioning slot 115 in the inner wall 113.

The mounting seat 13 has a base wall 131, a surrounding wall 132 extending integrally and downwardly from the base wall 131, a horizontal mounting plate 133 formed integrally with a rear end of the base wall 131 and having a hole 134 formed therethrough and a notch 135. The hole 134 is located in front of the notch 135 and behind the base wall 131.

Figure 4:
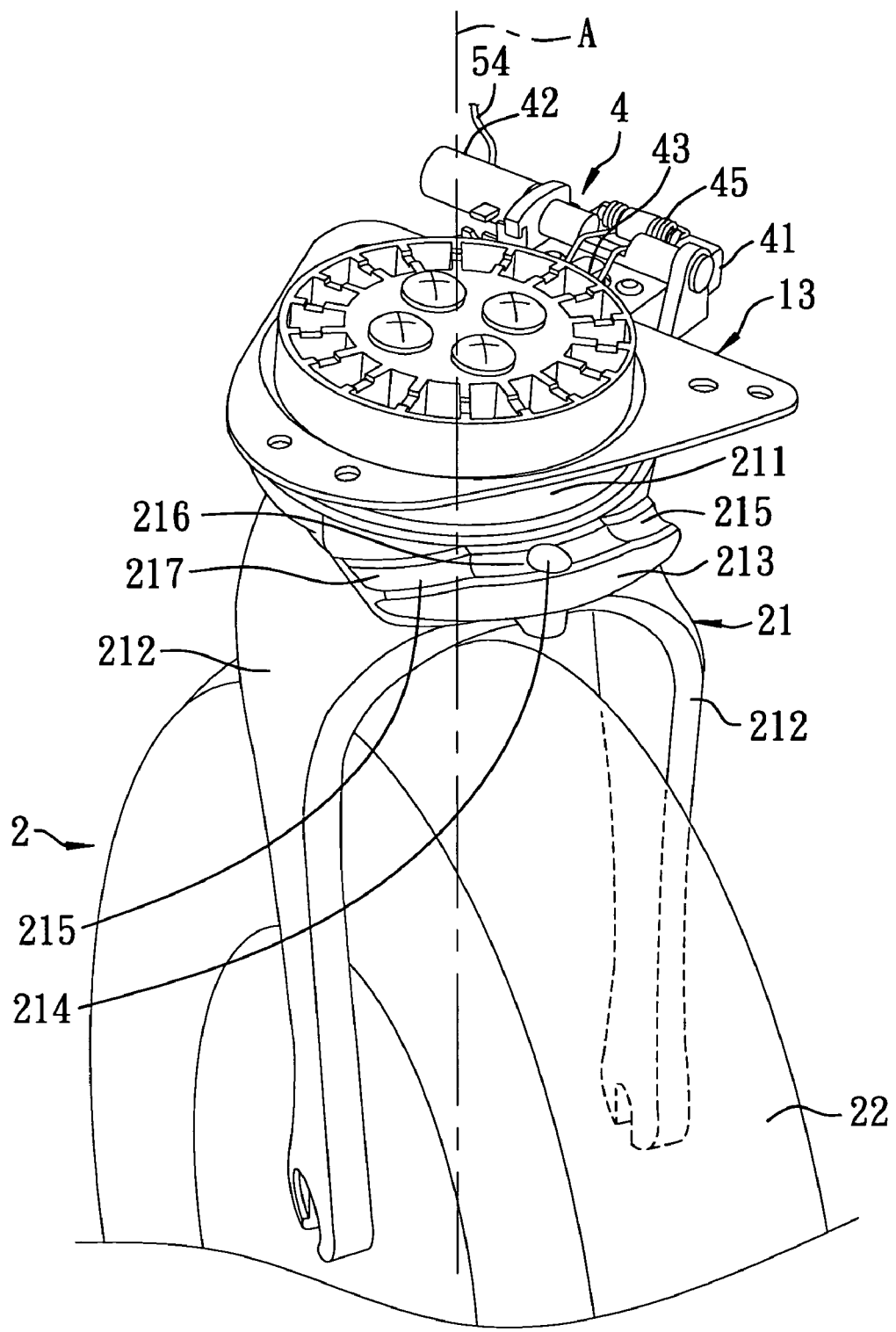
FIG. 4 is a fragmentary, assembled perspective view of the mounting seat, the direction-limiting device, and a wheel unit of the first preferred embodiment.
Figure 5:
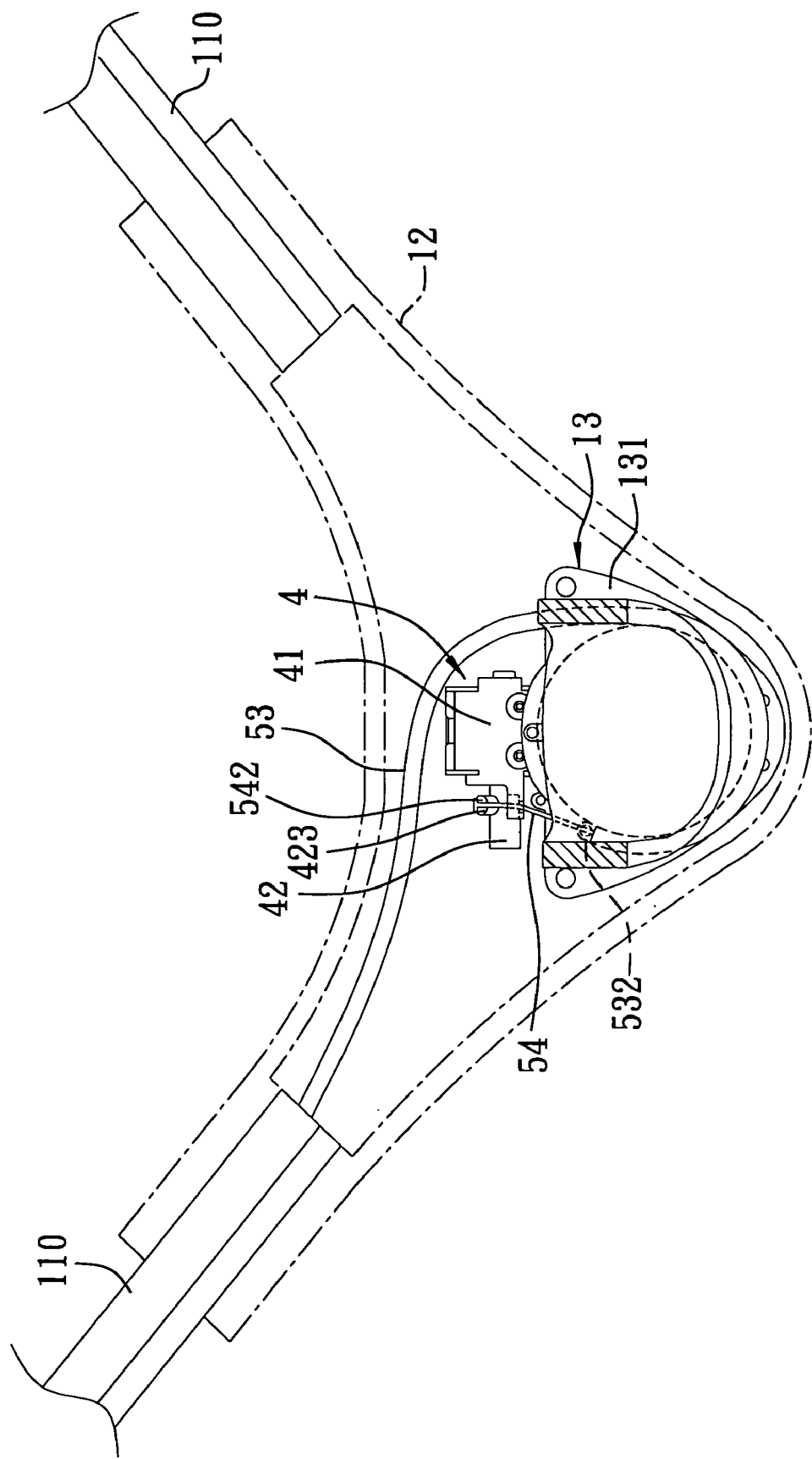
FIG. 5 is a schematic fragmentary bottom view of the first preferred embodiment, illustrating how a pull cord is mounted on the stroller.

Referring to FIGS. 2, 3, and 4, the wheel unit 2 is disposed under the mounting seat 13, and includes a wheel-supporting member 21 connected pivotally to the mounting seat 13, and a front wheel 22 connected rotatably to the wheel-supporting member 21. The wheel-supporting member 21 is rotatable relative to the mounting seat 13 about a rotating axis (A) (see FIG. 4), and includes a top plate 211, two fork legs 212 disposed under and connected fixedly to the top plate 211, and a projecting plate 213 extending integrally and outwardly from a periphery of the top plate 211. The projecting plate 213 has a top surface that is formed with a limiting hole 214 and two guide slots 215 which are located on two opposite sides of the limiting hole 214, that are communicated with the limiting hole 214, and that extend along a circumferential direction of the rotating axis (A). The hole 134 in the mounting plate 133 of the mounting seat 13 is located above the limiting hole 214 in the projecting plate 213. Each of the guide slots 215 has a high end 216 proximate to the limiting hole 214, and a low end 217 distal from the limiting hole 214.

The direction-limiting device 4 includes a base 41, a controlling element 42, a direction-limiting element 43, a pivot pin 44, and a biasing member 45. The base 41 is disposed under and is fixed on the mounting plate 133 of the mounting seat 13, and has an integral stop element 410, a top surface 411 that is formed with two spaced-apart integral upright walls 412 and an integral projection 413 that extends into the notch 135 in the mounting plate 133 of the mounting seat 13, and a hole 414 formed through the base 41 and aligned with the hole 134 in the mounting plate 133 along a vertical direction. The controlling element 42 is configured as a rod that has a circular cross-section, is journalled on the upright walls 412 between the projection 413 and the direction-limiting element 43, and includes a positioning tongue 420 extending integrally, radially, and outwardly therefrom, a driven end 422 with a cord-connecting element 423, and a recess (R) to define a thinner rod portion 424 that has a planar surface (424P) (see FIG. 7) and a curved surface (424N) (see FIG. 7). The direction-limiting element 43 extends through the hole 414 in the base 41, and is moved relative to the mounting seat 13 between a limiting position shown in FIG. 7, where the positioning tongue 420 of the controlling element 42 abuts against the stop element 410 of the base 41 and where the direction-limiting element 43 is inserted into the limiting hole 214 in the wheel-supporting member 21 so as to prevent rotation of the wheel-supporting member 21 relative to the stroller frame 1, and a release position shown in FIG. 8, where the direction-limiting element 43 is removed from the limiting hole 214 in the wheel-supporting member 21 so as to permit the rotation of the wheel-supporting member 21 relative to the stroller frame 1. The guide slots 215 in the wheel-supporting member 21 can guide a lower end of the direction-limiting element 43 to move into the limiting hole 214 in the wheel-supporting member 21. The biasing member 45 is mounted rotatably on the projection 413 by the pivot pin 44, and is formed with two resilient pressing arms 451 that have free ends inserted respectively into and rotatable within two aligned holes 432 in an upper end of the direction-limiting element 43 and that press the thinner rod portion 424 of the controlling member 42 against the top surface 411 of the base 41. As such, the biasing member 45 can bias the direction-limiting element 43 to move downwardly to the limiting position.

Referring to FIGS. 2, 3, 5, and 6, the control device 5 includes a coiled compression spring 50, an adjusting member 51, an anchor rod 52, a tube 53, and a pull cord 54. The adjusting member 51 is sleeved movably around an upper portion of the right wheel rod 110, as shown in FIG. 1, is movable along a longitudinal direction of the right wheel rod 110 between a lower limit position shown in FIG. 6 and an upper limit position shown in FIG. 9, and has inner and outer plate portions 511, 512 that abut respectively against outer surfaces of the inner and outer walls 113, 114 of the right wheel rod 110. The inner plate portion 511 is formed with a circular hole 13 therethrough. The outer plate portion 512 is formed with a hollow cylindrical protrusion 514 that defines a counterbore 515 and that has an annular end wall 510. The hollow cylindrical protrusion 514 is received slidably within the slide slot 118 in the outer wall 114 of the right wheel rod 110. The counterbore 515 has a small-diameter bore portion (B1) proximate to the inner plate portion 511, and a large-diameter bore portion (B2) distal from the inner plate portion 511 and having a diameter larger than that of the small-diameter bore portion (B1).

The anchor rod 52 is received slidably within the positioning hole 115 in the right wheel rod 110, and includes a small-diameter rod portion 521 and a large-diameter rod portion 522. The small-diameter rod portion 521 extends through the counterbore 515 in the outer plate portion 512 of the adjusting member 51. The large-diameter rod portion 522 has a diameter which is slightly smaller than that of the circular upper slot portion 117 of the positioning slot 115 in the right wheel rod 110 and which is larger than that of the small-diameter rod portion 521 and the width of the uniform-diameter lower slot portion 116 of the positioning slot 115 in the right wheel rod 110. The small-diameter rod portion 521 has an externally threaded inner end that engages an internally threaded inner end of the large-diameter rod portion 522. Each of the small-diameter and large-diameter rod portions 521, 522 has an outer end that is formed with an outward flange 523, 524 which extends radially and outwardly therefrom and which is disposed outwardly of the adjusting member 51. The coiled compression spring 50 is sleeved around the small-diameter rod portion 521 of the anchor rod 52 between the end wall 510 of the hollow cylindrical protrusion 514 and the outward flange 523 of the small-diameter rod portion 521 of the anchor rod 52.

The tube 53 has an upper end that is formed with a lug 531 connected threadedly to the right wheel rod 110, an intermediate portion extending into the right wheel rod 110, a lower portion 532 extending from a lower end of the right wheel rod 110 and connected fixedly to and disposed under the mounting seat 13, and a lower end that is formed with a lug 532 connected fixedly to the mounting seat 13.

The pull cord 54 has an upper end 541 that is fastened to the adjusting member 51, and a lower end 542 that is fastened to the cord-connecting element 423 of the controlling element 42. As such, when the adjusting member 51 moves along the right wheel rod 110, the controlling element 42 is rotated relative to the base 41 so as to move the free ends of the pressing arms 451 of the biasing member 45 toward and away from the top surface 411 of the base 41, thereby moving the direction-limiting element 43 between the limiting position and the release position.

Figure 6:
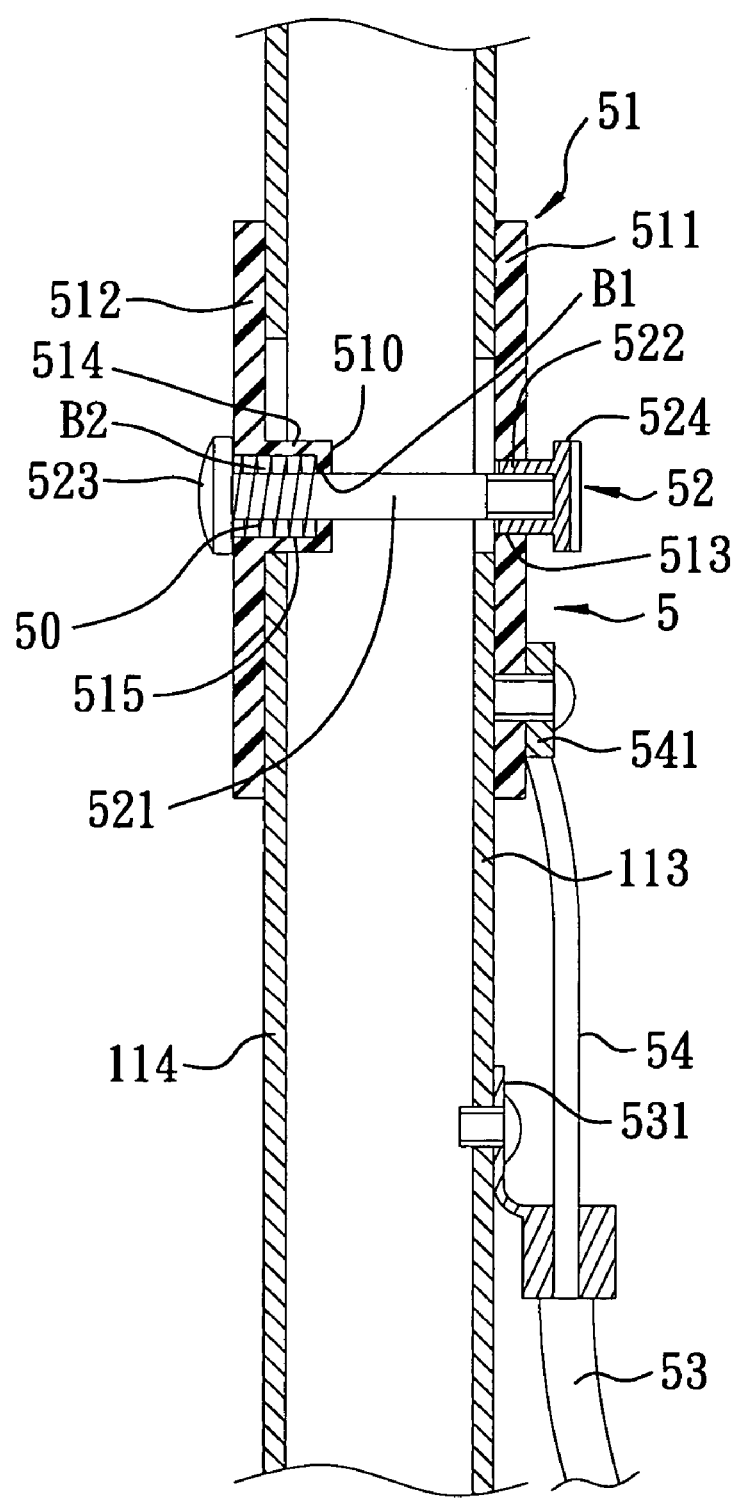
FIG. 6 is a fragmentary sectional view of the first preferred embodiment, illustrating how an adjusting member of the control device is disposed at a lower limit position.
Figure 7:
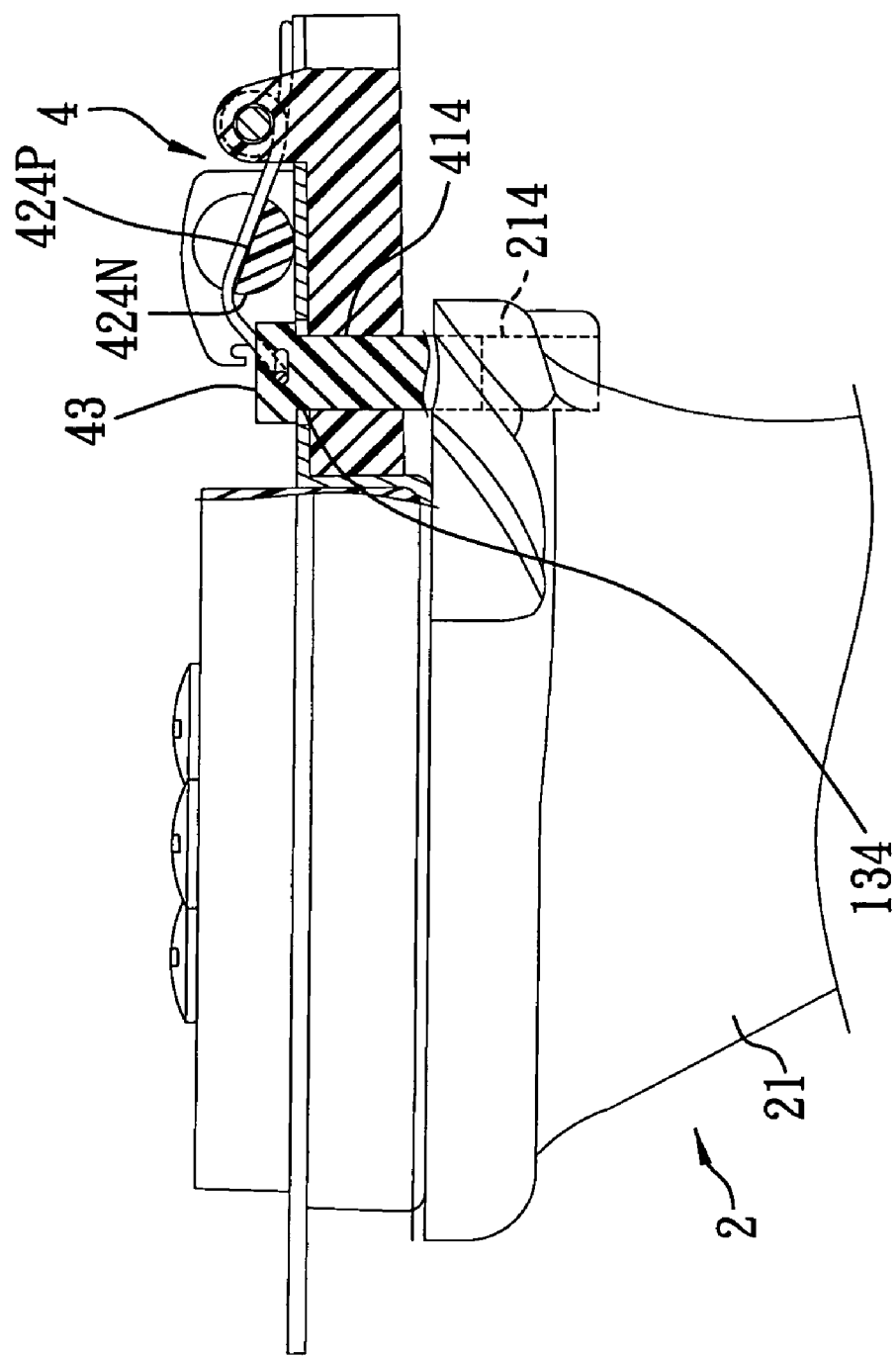
FIG. 7 is a fragmentary, partly exploded side view of the first preferred embodiment, illustrating how a direction-limiting element is disposed at a limiting position.
Figure 8:
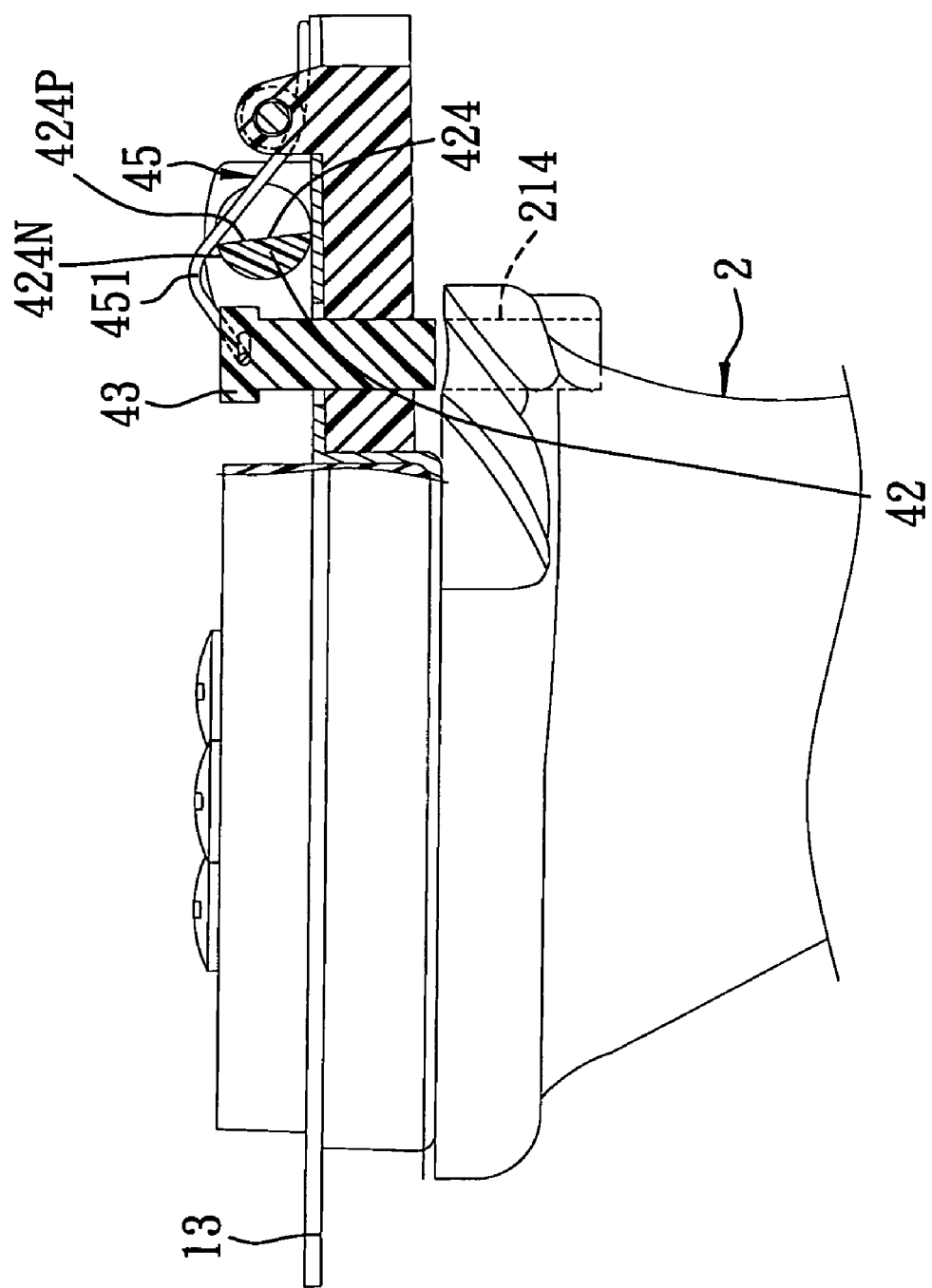
FIG. 8 is a fragmentary, partly exploded side view of the first preferred embodiment, illustrating how the direction-limiting element is disposed at a release position.

When the adjusting member 51 is disposed at the lower limit position shown in FIG. 6, the small-diameter rod portion 521 of the anchor rod 52 is disposed at a lower end of the uniform-diameter lower slot portion 116 of the positioning slot 115 in the right wheel rod 110 so that the pressing arms 451 abut against the planar surface (242P) of the thinner rod portion 242 of the anchor rod 24, thereby moving the direction-limiting element 43 to the limiting position shown in FIG. 7. At this time, because the controlling element 42 is retained at the position shown in FIG. 7 by the biasing member 45 so as to prevent upward movement of the pull cord 53, the adjusting member 51 is retained at the lower limit position. As such, the wheel-supporting member 21 cannot rotate relative to the mounting seat 13 so as to prevent change of the direction of the front wheel 22.

Figure 9:
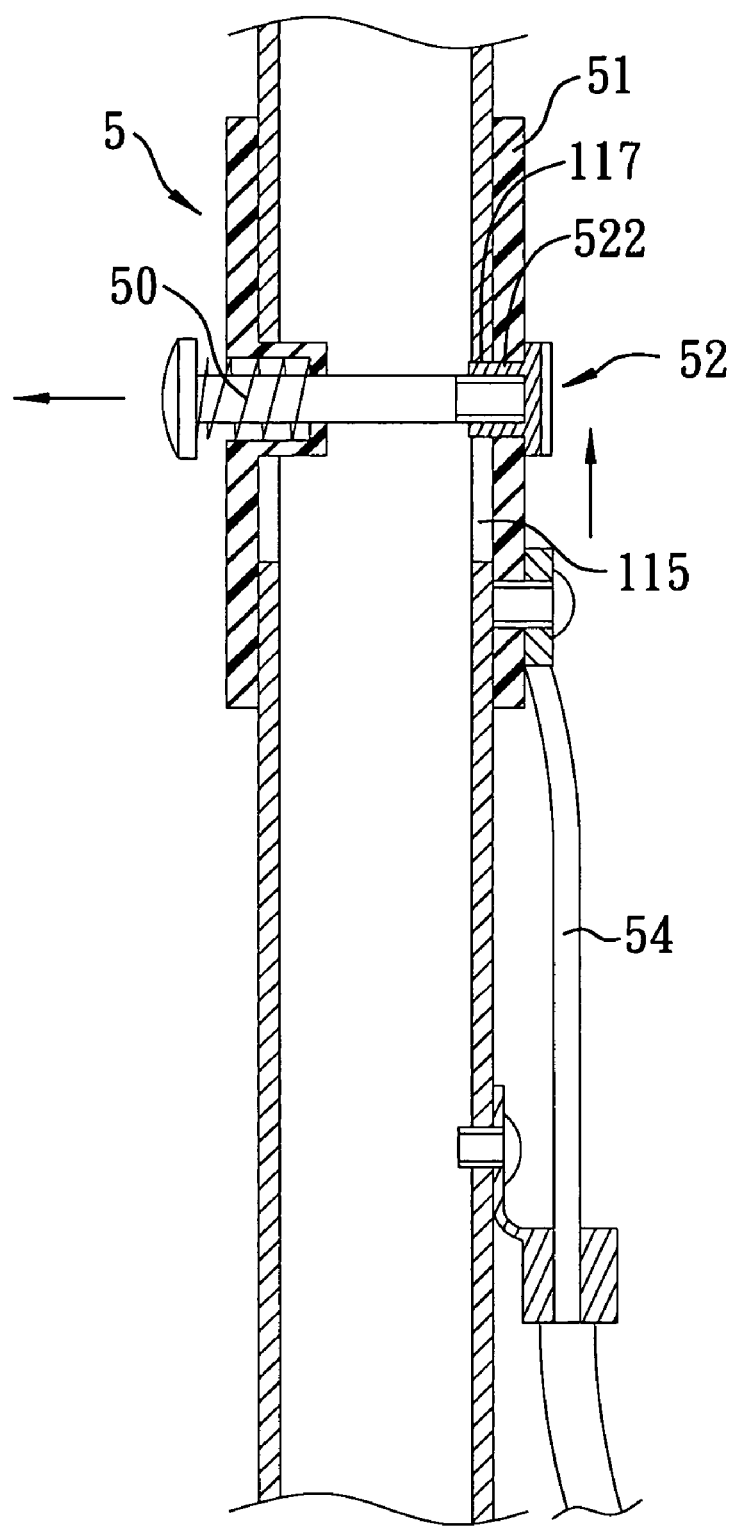
FIG. 9 is a fragmentary sectional view of the first preferred embodiment, illustrating how the adjusting member is disposed at an upper limit position.

When the adjusting member 51 is moved from the lower limit position to the upper limit position shown in FIG. 9 so that the small-diameter rod portion 521 of the anchor rod 52 moves into the circular upper slot portion 117 of the positioning slot 115 in the right wheel rod 110, the coiled compression spring 50 biases the outward flange 524 of the large-diameter rod portion 522 of the anchor rod 52 to press against an outer surface of the inner plate portion 511 of the adjusting member 51 so as to move the large-diameter rod portion 522 of the anchor rod 52 into the circular upper slot portion 117 of the positioning slot 115. Because the large-diameter rod portion 522 of the anchor rod 52 engages fittingly within the circular upper slot portion 117 of the positioning slot 115, the adjusting member 51 can be retained at the upper limit position. As such, the pressing arms 451 are removed from the planar surface (242P) of the thinner rod portion 242 of the anchor rod 24 so as to move the direction-limiting element 43 to the release position shown in FIG. 8, thereby permitting change of the direction of the front wheel 22.

When it is desired to move the adjusting member 51 from the upper limit position to the lower limit position, it is only necessary to move forcibly the outward flange 523 of the small-diameter rod portion 521 of the anchor rod 52 toward an outer surface of the outer plate portion 512 of the adjusting member 51 against the biasing action of the coiled compression spring 50 so as to remove the large-diameter rod portion 522 of the anchor rod 52 from the positioning slot 115 in the right wheel rod 110.

Figure 10:
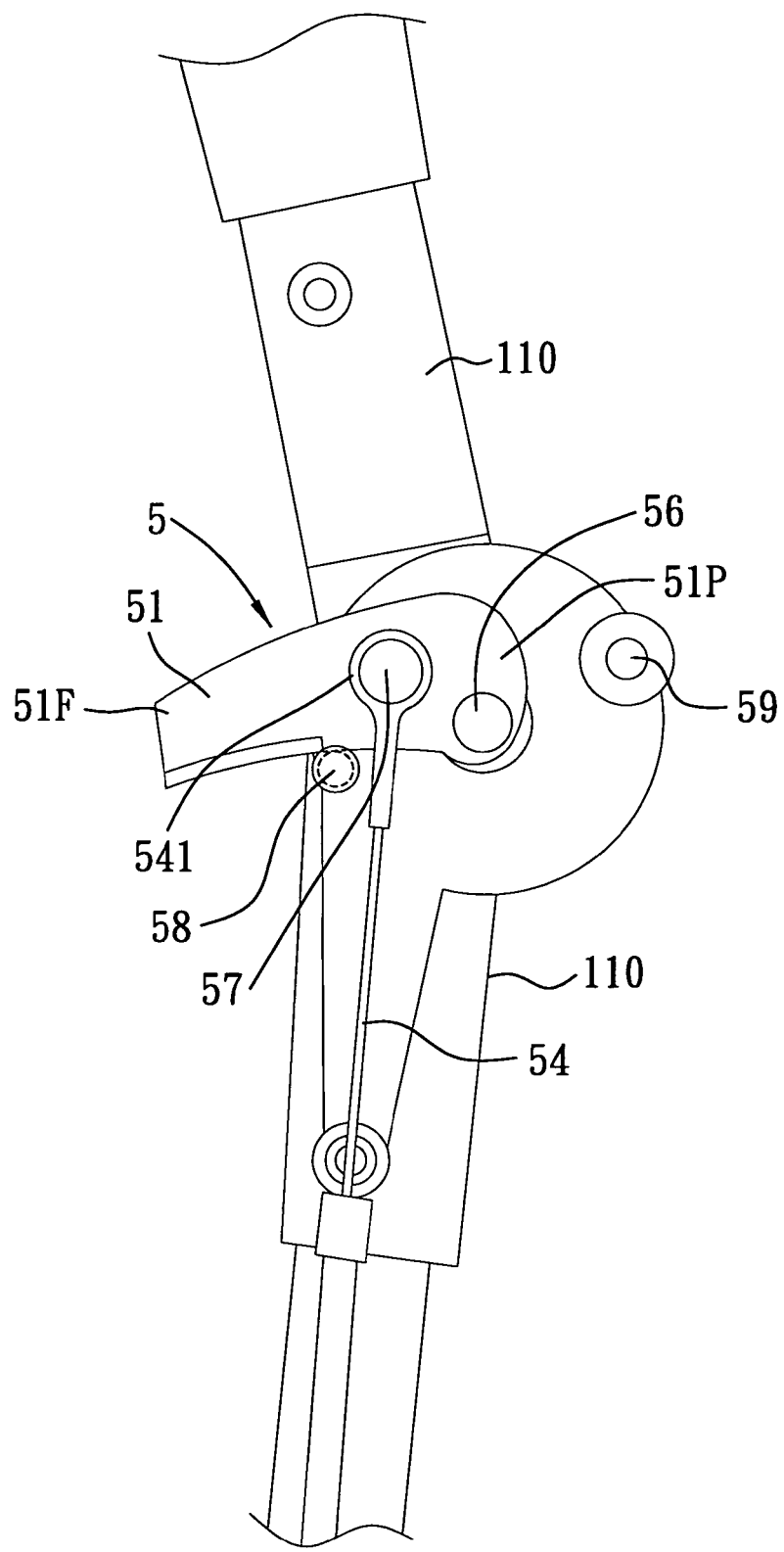
FIG. 10 is a fragmentary side view of the second preferred embodiment of a stroller according to this invention, illustrating how an adjusting member is disposed at a first position.
Figure 11:
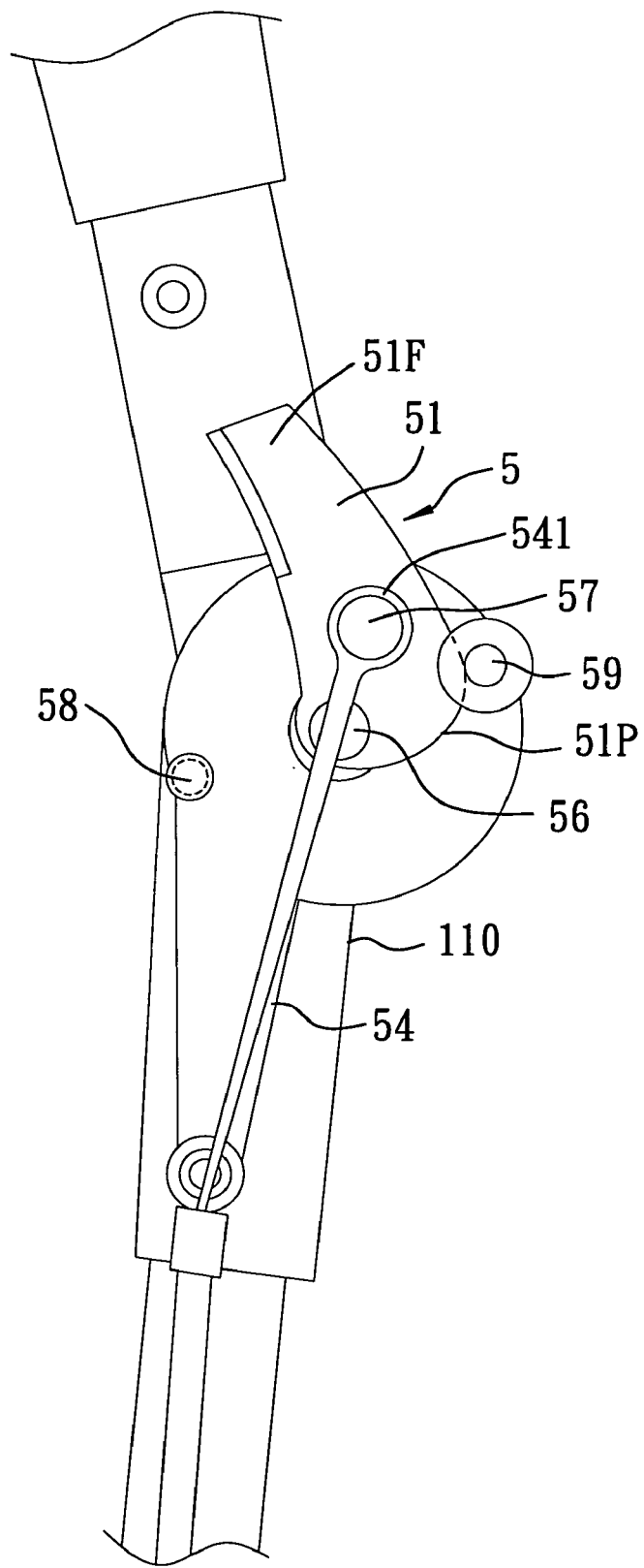
FIG. 11 is a fragmentary side view of the second preferred embodiment, illustrating how the adjusting member is disposed at a second position.

Referring to FIGS. 10 and 22, a modified control device 5 is shown to include an adjusting member 51 configured as a swing lever and having a pivot end (51P) that is connected rotatably to the right wheel rod 110 by a pivot pin 56. The pull cord 54 has an upper end 541 that is connected rotatably to the adjusting member 51 by a pivot pin 57 at a location between the pivot end (51P) and the free end (51F) of the adjusting member 51. The modified control device 5 further includes a pair of first and second stop rods 58, 59 that are connected fixedly to the right wheel rod 110. The adjusting member 51 is swingable between the first and second stop rods 58, 59. As such, the adjusting member 51 is rotatable relative to the right wheel rod 110 between a first position shown in FIG. 10, where the adjusting member 51 abuts against the first stop rod 58 and where the direction-limiting element 43 is disposed at the limiting position, and a second position shown in FIG. 11, where the adjusting member 51 abuts against the second stop rod 59 and where the direction-limiting element 43 is disposed at the release position.

Because the adjusting member 51 is disposed at the upper portion of the right wheel rod 110, there is no need for the user to bend when he or she is operating the adjusting member 51. Thus, the object of this invention can be achieved.

With this invention thus explained, it is apparent that numerous modifications and variations can be made without departing from the scope and spirit of this invention. It is therefore intended that this invention be limited only as indicated by the appended claims.

I claim:
1. A stroller comprising:
 a stroller frame including a handle unit and a mounting seat disposed below and connected fixedly to said handle unit;
 a wheel unit disposed under said mounting seat and including a wheel-supporting member that is connected pivotally to said mounting seat and that has a limiting hole, and a wheel that is connected rotatably to said wheel-supporting member;
 a direction-limiting device including a direction-limiting element movable relative to said mounting seat between a limiting position, where said direction-limiting element is inserted into said limiting hole in said wheel-supporting member of said wheel unit so as to prevent rotation of said wheel-supporting member of said wheel unit relative to said stroller frame, and a release position, where said direction-limiting element is removed from said limiting hole in said wheel-supporting member of said wheel unit so as to permit the rotation of said wheel-supporting member of said wheel unit relative to said stroller frame; and
 a control device including an adjusting member disposed on an upper portion of said handle unit of said stroller frame, and a pull cord disposed between said adjusting member and said direction-limiting element, said adjusting member being operable to move said direction-limiting element between said limiting position and said release position.

2. The stroller as claimed in claim 1, wherein said mounting seat is formed with an integral mounting plate that has a hole which is formed therethrough and which is located above said limiting hole in said wheel-supporting member of said wheel unit, said direction-limiting element extending through said hole in said mounting plate of said mounting seat.

3. The stroller as claimed in claim 1, wherein said direction-limiting device further includes a biasing member for biasing said direction-limiting element to move downwardly to said limiting position, and a controlling element rotatable relative to said mounting seat to move said direction-limiting element between said limiting position and said release position.

4. The stroller as claimed in claim 3, wherein said direction-limiting device further includes a base fixed on said mounting plate of said mounting seat and having a top surface that is formed with an integral projection and two spaced-apart integral upright walls, said biasing member being mounted rotatably on said projection and being formed with two resilient pressing arms that have free ends which are connected rotatably to an upper end of said direction-limiting element, said controlling element being journalled on said upright walls between said projection and said direction-limiting element and being configured as a rod that has a circular cross-section and a recess to define a thinner rod portion, said pressing arms of said biasing member pressing said thinner rod portion of said controlling element against said top surface of said base, said control device being operable to rotate said controlling element relative to said base so as to move said free ends of said pressing arms of said biasing member toward and away from said top surface of said base of said direction-limiting device, thereby moving said direction-limiting element between said limiting position and said release position.

5. The stroller as claimed in claim 4, wherein said handle unit includes a pair of aligned left and right wheel rods, said mounting seat being disposed below and connected fixedly to said left and right wheel rods, said adjusting member being disposed movably on one of said left and right wheel rods and being movable along a longitudinal direction of said one of said left and right wheel rods, said pull cord having an upper end that is fastened to said adjusting member, and a lower end that is fastened to said controlling element so as to rotate said controlling element when said adjusting member moves along said one of said left and right wheel rods.

6. The stroller as claimed in claim 5, wherein said one of said left and right wheel rods is formed with a positioning slot that has a circular upper slot portion and a uniform-diameter lower slot portion which has an upper end coupled with a lower end of said circular upper slot portion, and a width smaller than a diameter of said circular upper slot portion, said control device further including a spring-loaded anchor rod that is received slidably within said positioning slot in said one of said left and right wheel rods and that includes a small-diameter rod portion, and a large-diameter rod portion having a diameter which is slightly smaller than that of said circular upper slot portion of said positioning slot in said one of said left and right wheel rods and which is larger than that of said small-diameter rod portion and the width of said uniform-diameter lower slot portion of said positioning slot in said one of said left and right wheel rods, said adjusting member being movable relative to said one of said left and right wheel rods between a lower limit position, where said direction-limiting element is disposed at said limiting position and where said small-diameter rod portion of said anchor rod is disposed at a lower end of said uniform-diameter lower slot portion of said positioning slot in said one of said left and right wheel rods, and an upper limit position, where said direction-limiting element is disposed at said release position and where said large-diameter rod portion of said anchor rod engages fittingly said circular upper slot portion of said positioning slot in said one of said left and right wheel rods.

7. The stroller as claimed in claim 6, wherein said small-diameter rod portion of said anchor rod has an externally threaded inner end and an outer end that is formed with an outward flange which extends radially and outwardly therefrom and which is disposed outwardly of said adjusting member, said large-diameter rod portion of said anchor rod having an internally threaded inner end that engages said externally threaded inner end of said small-diameter rod portion of said anchor rod, and an outer end that is formed with an outward flange which extends radially and outwardly therefrom and which is disposed outwardly of said adjusting member.

8. The stroller as claimed in claim 7, wherein said one of said left and right wheel rods is tubular, has an upper portion, and is formed with opposite inner and outer walls that are parallel to each other, each of said inner and outer walls having an outer surface, said positioning slot being formed through said inner wall, said outer wall being formed with a slide slot therethrough, said adjusting member being sleeved movably around said upper portion of said one of said left and right wheel rods and having inner and outer plate portions that abut respectively against said outer surfaces of said inner and outer walls, said inner plate portion being formed with a circular hole therethrough, said outer plate portion being formed with a hollow cylindrical protrusion that defines a counterbore and that has an annular end wall, said hollow cylindrical protrusion being received slidably within said slide slot in said outer wall of said one of said left and right wheel rods, said counterbore having a small-diameter bore portion proximate to said inner plate portion, and a large-diameter bore portion distal from said inner plate portion and having a diameter larger than that of said small-diameter bore portion, said small-diameter rod portion of said anchor rod extending through said counterbore in said outer plate portion, each of said inner and outer plate portions having an outer surface, said control device further including a coiled compression spring that is sleeved around said small-diameter rod portion of said anchor rod between said end wall of said hollow cylindrical protrusion and said outward flange of said small-diameter rod portion of said anchor rod so as to bias said outward flange of said large-diameter rod portion of said anchor rod to press against said outer surface of said inner plate portion of said adjusting member, thereby engaging said large-diameter rod portion of said anchor rod with said circular upper slot portion of said positioning slot in said inner wall of said one of said left and right wheel rods when said adjusting member is disposed at said upper limit position, said outward flange of said small-diameter rod portion of said anchor rod being movable forcibly toward said outer surface of said outer plate portion of said adjusting member against biasing action of said coiled compression spring so as to remove said large-diameter rod portion of said anchor rod from said circular upper slot portion of said positioning hole in said inner wall, thereby permitting said small-diameter rod portion of said anchor rod to move from said circular upper hole portion of said positioning hole into said uniform-diameter lower hole portion of said positioning hole.

9. The stroller as claimed in claim 2, wherein said wheel-supporting member of said wheel unit is rotatable relative to said mounting seat about a rotating axis, said wheel-supporting member of said wheel unit further having two guide slots that are located on two opposite sides of said limiting hole in said wheel-supporting member of said wheel unit, that are communicated with said limiting hole in said wheel-supporting member of said wheel unit, and that extend along a circumferential direction of said rotating axis so as to guide said direction-limiting element to move into said limiting hole in said wheel-supporting member of said wheel unit when said wheel-supporting member of said wheel unit rotates relative to said mounting seat.

10. The stroller as claimed in claim 1, wherein said adjusting member is configured as a swing lever, and has a pivot end connected pivotally to said handle unit, and a free end, said pull cord having an upper end that is connected pivotally to said adjusting member at a location between said pivot end and said free end of said adjusting member, and a lower end that is fastened to said controlling element so as to rotate said controlling element when said adjusting member rotates on said handle unit between first and second positions.

11. The stroller as claimed in claim 10, wherein said control device further includes a pair of first and second stop rods that are connected fixedly to said handle unit, said adjusting member being swingable between said first and second stop rods, said adjusting member abutting against said first stop rod when said direction-limiting element is disposed at said limiting position, said adjusting member abutting against said second stop rod when said direction-limiting element is disposed at said release position.

* * * * *